United States Patent [19]

Funaki

[11] 4,036,134

[45] July 19, 1977

[54] SYMBOL INDICATION DRUM

[75] Inventor: Takashi Funaki, Nagano, Japan

[73] Assignee: Kabushiki Kaisha Sankyo Seiki Seisakusho, Japan

[21] Appl. No.: 585,772

[22] Filed: June 11, 1975

Related U.S. Application Data

[62] Division of Ser. No. 410,336, Oct. 29, 1973, abandoned.

[30] Foreign Application Priority Data

Nov. 4, 1972 Japan .................... 47-127312[U]

[51] Int. Cl.² ................ B41M 1/40; G01D 13/12
[52] U.S. Cl. ...................... 101/426; 101/38 R; 116/114 R
[58] Field of Search .......... 101/35, 36, 38 R, 426, 101/226, 228, 181, 227; 235/1 C; 116/114 R

[56] References Cited

U.S. PATENT DOCUMENTS

| | | | |
|---|---|---|---|
| 1,163,616 | 12/1915 | Des Jardins | 235/1 C |
| 1,357,565 | 11/1920 | Jacobus | 235/1 C |
| 1,695,663 | 12/1928 | Rodanet | 235/1 C |
| 2,288,187 | 6/1942 | Gits et al. | 235/1 C |
| 2,564,657 | 8/1951 | George | 101/36 X |
| 2,716,378 | 8/1955 | George | 101/38 R |
| 2,720,359 | 10/1955 | Grimmeisen | 235/1 C |
| 2,720,681 | 10/1955 | Danielson et al. | 235/1 C |
| 2,747,011 | 5/1956 | Moser | 116/114 R X |
| 2,802,666 | 8/1957 | Crosfield | 101/181 X |
| 3,015,266 | 1/1962 | Anderson et al. | 101/181 X |
| 3,189,273 | 6/1965 | Hellen | 235/1 C |
| 3,440,705 | 4/1969 | Johnson | 101/36 X |
| 3,603,250 | 9/1971 | Knudsen | 101/36 |
| 3,696,738 | 10/1972 | Walker | 101/38 |
| 3,727,833 | 4/1973 | Muller | 235/1 C |
| 3,808,971 | 5/1974 | Staamann | 101/228 X |

Primary Examiner—Russell R. Kinsey
Assistant Examiner—Paul J. Hirsch
Attorney, Agent, or Firm—McGlew and Tuttle

[57] ABSTRACT

A drum is formed on its outer peripheral surface with symbols and symbol position ascertaining marks, and a tester of simple construction is used for testing whether or not the symbols are positioned with a high degree of precision. The symbols, which include characters, numerals, code marks and the like, are superposed directly on the drum by printing or etching or indirectly by affixing to the drum body a belt on which the symbols are positioned. The drums can be used with any apparatus requiring symbol indication, e.g. time measuring instruments, gas meters, or calculators.

3 Claims, 11 Drawing Figures

SYMBOL INDICATION DRUM

This is a division of application Ser. No. 410,336 filed Oct. 29, 1973, now abandoned.

BACKGROUND OF THE INVENTION

This invention relates to a symbol indication drum adapted for use with apparatus requiring symbol indication, e.g. time measuring instruments or computers.

Symbols may be provided on the outer peripheral surface of a symbol indication drum directly by superposing them thereon by printing or etching, or indirectly by affixing to a drum body a belt on which symbols are formed beforehand. In either case, it is not possible to give accurate information by symbol indication unless the symbols are all disposed in predetermined positions with a high degree of precision.

When the symbols are superposed on the drum by printing, for example, it often happens that the master plate used slips and causes the symbols to be inordinately extended longitudinally or displaced transversely, with a result that the symbols are not correctly spaced apart from one another. When a symbol carrying belt is affixed to the drum body, expansion or contraction of the belt may be uneven throughout the length of the belt, thereby causing the symbols to be disposed at irregular intervals.

In testing whether or not the symbols are disposed in correct positions when a symbol carrying belt is affixed to a drum, there has hitherto been used a cylindrical tester sleeve having a transparent window, such as shown in FIG. 2, with a frame of reference lines denoting the height and width of the drum indicia. However, use of a tester sleeve such as shown in FIG. 2 has been time-consuming, as each drum indicia must be individually checked for both lateral and longitudinal positioning, which has suggested that the production of symbol indication drums can be facilitated by improvements in the drum as well as in the means for testing or checking the position of the indicia thereon.

SUMMARY OF THE INVENTION

This invention has as its object the provision of a symbol indication drum which has symbol position ascertaining marks formed on the outer peripheral surface of the drum so as to permit any variation in the position of each symbol on the outer periphery of the drum to be detected with ease, and to an improved tester sleeve and a method of using the same.

The outstanding characteristic of the invention is that it is possible to test the degree of precision with which the symbols are positioned on the outer peripheral surface of the drum by using the symbol position ascertaining marks without studying the outlines of the symbols as has hitherto been the case. This makes it possible readily and speedily to detect drums which are unsatisfactory for specifications, thereby reducing cost.

In this invention, the symbols refer to characters, numerals, code marks and the like and the symbol position ascertaining marks refer to crosses (+), dots (.), perforations (0), or other marks.

DESCRIPTION OF EMBODIMENTS

Figure 1:
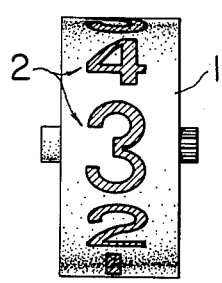
FIG. 1 is a front view of a symbol indication drum of the prior art.

A counter, digital timer, or the like comprises a drum having numerals printed or otherwise superposed on its outer peripheral surface and adapted to be rotated for indicating a counted value or the hours. The prior art method of testing the positions of the numerals printed or otherwise superposed on the outer peripheral surface of a drum will be first described with reference to the drawings. In FIG. 1, there is shown a drum 1 on whose outer peripheral surface numerals 2 are superposed at regular intervals by printing, which is the simplest and quickest method of superposing numerals on the drum.

Figure 3:
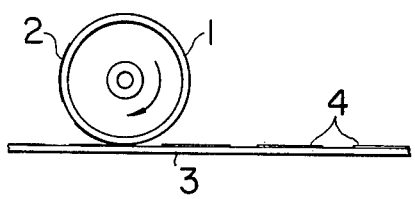
FIG. 3 is a side view of a drum and a master plate showing the manner in which symbols are printed on the outer periphery of the drum.

In FIG. 3, there is shown a master plate 3 in web form on which inked mirror images 4 of numerals 0 to 9 are arranged at a constant pitch. In printing numerals on the outer peripheral surface of the drum 1, the master plate 3 is brought into contact with the outer peripheral surface of the drum 1 and the drum 1 is moved in rolling motion without slipping thereon, so that the numerals 0 to 9 can be printed by transferring the inked mirror images 4 to the drum to provide printed images on the drum.

When the path of movement of the drum 1 deviates, even if slightly, from the longitudinal center axis of the master plate 3, as the former is moved on the latter, there is a discrepancy between the relative positions of the first numeral printed and the last numeral printed when the printing is finished. Also, when a slip occurs between the drum 1 and master plate, the numeral printed at the time of the slip is extended circumferentially and becomes disfigured and the spacing between the circumferentially extended numeral and the next following numeral grows smaller than other spacings, no matter how small the slip is.

Figure 2:
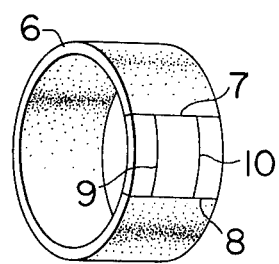
FIG. 2 is a perspective view of a tester of the prior art for ascertaining the positions of symbols on a symbol indication drum.

In order to obviate the aforementioned disadvantages of the method of printing numerals on the drum, it has hitherto been customary to use a tester 6 of annular shape shown in FIG. 2. The tester 6, which is made of a transparent material, is provided on its inner peripheral surface with a frame consisting of reference lines 7, 8, 9 and 10 which denote the height and width of the numeral 2. The tester 6 has an inner diameter which is slightly larger than the outer diameter of the drum 1 so that the latter may be loosely fitted in the former. In testing whether or not the numerals 2 printed on the outer peripheral surface of the drum 1 are correctly positioned, the drum 1 is inserted in the tester 6 and rotated so as successively to bring one numeral after another into index with the frame defined by the reference lines 7, 8, 9 and 10. The operator checks whether or not each numeral 2 fits in the frame defined by the reference lines 7 to 10 by studying the height and width or outlines of the figure from outside.

In carrying out the aforementioned test, the width of a numeral 2 is tested and, while the right and left ends of the numeral are aligned with the vertical reference lines 9 and 10, the upper (or lower) end of the numeral is made to align with one of the transverse reference lines 7 and 8 and then the lower (or upper) end thereof is made to align with the other transverse reference line. This is a troublesome operation and an error is liable to be made. Thus it takes a long time to finish the testing of all the numerals on the drum.

In printing symbols on the drum 1 by transfer printing from the master plate 3, it is required to bring the former into pressing engagement with the latter with a suitable force. Thus, the numerals printed on the drum may be deformed by ink stains or shortage of ink or due to the quantity or the quality of ink supplied to the master plate or the finish of the outer peripheral surface of the drum.

Figure 5:
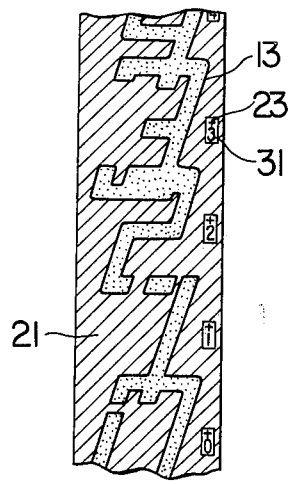
FIG. 5 is a developed view of the outer peripheral surface of the symbol indication drum comprising a second embodiment of the invention.
Figure 6:
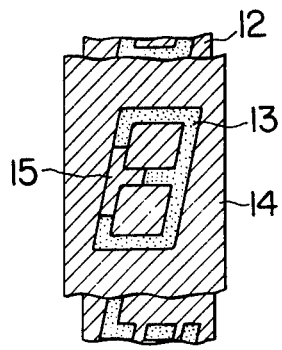
FIG. 6 is a schematic view showing the manner in which the symbol indication drum shown in FIG. 5 is put to use.

The numerals printed on the outer peripheral surface of the drum may be arranged by a method described below and shown in FIGS. 5 and 6. In FIG. 5 which shows, in a developed view, the outer peripheral surface of a drum 21 shown in FIG. 6, numerals 13 disposed on the outer peripheral surface of the drum 12 overlap the adjacent numerals and can be read by superposing on the numerals 13 a mask plate 14 which is of the same color as the color of the background against which the numerals 13 is disposed. More specifically, the mask plate 14 is formed therein with a plurality of windows 15 (only one is shown in FIG. 6) formed by two parallel upright slits and three parallel horizontal slits extending from one upright slit to the other, with the upright slits being slightly inclined. When the mask plate 14 is placed on the outer peripheral surface of the drum 12, it is only those numerals 13 which can be seen through the windows 15 that can be read from outside, with other numerals being covered by the windowless portion of the mask plate 14. The windowless portion of the mask plate 14 is of the same color as the background of the drum 12, so that the numerals 13 can be clearly recognized through the windows (the numeral "3" (three) can be seen in FIG. 6).

The method of arranging the numerals such as shown in FIGS. 5 and 6 offers the advantage of permitting numerals of a large size to be printed and indicated in a relatively small space, because the pitch of the numerals printed by this method is one-half that of the numerals printed by the method shown in FIG. 1. However, the testing of the degree of precision with which the numerals 13 are arranged by the method shown in FIGS. 5 and 6 is far more troublesome than the testing of the degree of precision with which the numerals 2 are arranged by the method shown in FIG. 1, so that the method is very inefficient in operation.

Figure 4:
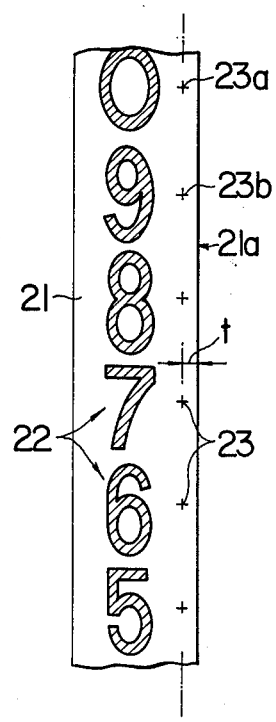
FIG. 4 is a developed view of the outer peripheral surface of the symbol indication drum comprising one embodiment of the invention.
Figure 7:
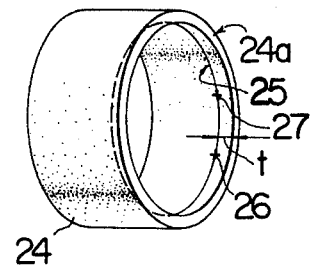
FIG. 7 is a perspective view of the tester used for testing the positions of the symbols according to the invention.

FIG. 4 shows, in a developed view, the outer peripheral surface of a drum 21 according to this invention. Formed in the vicinity of each of numerals 22 printed on the drum is a reference mask 23 which is disposed in a portion of the outer peripheral surface of the drum 21 which is covered with the mask 14 (see FIG. 6) when the drum and other parts are assembled into an apparatus. The reference marks 23, which are printed at the same time as the numerals 22 are printed, are disposed at regular intervals or spaced apart from one another by a constant pitch. If the drum 21 moves in rolling motion in a normal state longitudinally of the master plate 3 (See FIG. 3) when the numerals 22 are printed on its outer peripheral surface, all the reference points 23 will be spaced apart from an edge 21a of the periphery of the drum 21 by the same distance $t$. The testing of the degree of precision with which the numerals 22 are printed is effected by inserting the drum 21 in a tester 24 shown in FIG. 7. The tester 24, which is made of a transparent material, is formed on its inner peripheral surface with a circumferentially oriented reference line 25, which is disposed at a distance $t$ from an edge 24a of the tester 24. Two reference points 26 and 27 are formed on the reference line 25 in positions which are spaced apart from each other by one pitch of the numerals 22 on the drum 21.

By checking whether or not all the reference points 23 printed on the drum 21 are disposed on the reference line 25 on the tester 24 after the drum 21 is inserted in the tester 24 and their edges 21a and 24a are aligned with each other, it is possible to determine at once whether or not the numerals 22 are displaced transversely from their normal positions. Also, by bringing the reference point 23a of a numeral printed first or 0, for example, into index with the reference point 26 on the tester 24 and by checking whether the reference point 23b for the numeral printed lastly or 9, for example, is indexed with the reference point 27 on the tester 24, it is possible to determine whether or not the numerals 23 are displaced longitudinally from their normal positions. The result of this test gives a measure of the error committed in printing due to the slip of the drum on the master plate. Thus it will be seen that the degree of precision with which the numerals 22 are positioned transversely of the outer periphery of the drum can be determined by checking whether the reference points 23 on the drum 21 are brought into alignment with the reference line 25 on the tester 24, and that any displacement of the numerals 22 circumferentially from their normal positions can be found out at once by comparing the two reference points 26 and 27. It is not necessary to study the outlines of the numerals 22 in checking whether or not they are positioned correctly as has been done in the prior art.

The method of relying on the reference points in testing the degree of precision with which the numerals 22 are printed on the drum 21 has particular utility when used with the drum 21 in which the numerals are arranged by the method as shown in FIG. 5. As shown, a reference point 13 is provided for each of the numerals 23 printed on the drum 21, with each reference point 23 having added thereto a small figure 31 corresponding to the respective numeral 13 (the figure is 2 when the numeral 13 is 2, for example). The numerals 13 printed on the drum 21 overlap one another in parts as aforementioned. Thus difficulty is experienced in determining where one numeral ends and another numeral starts in judging whether the height and width of each numeral are correct as measured by using the tester of the prior art shown in FIG. 2. However, by inserting the tester 24 into the drum 21 shown in FIG. 4, the degree of precision with which the numerals 23 are printed on the drum 21 shown in FIG. 5 can be readily determined in a short time interval. The reference points 23 printed on the drum 21 as shown in FIG. 5 are disposed in positions in which they are covered with mask 14 and the reference points 23 printed on the drum 21 as shown in FIG. 4 are disposed in positions in which they are covered with a mask (not shown) which permits only the numerals 22 to be indicated.

Figure 8:
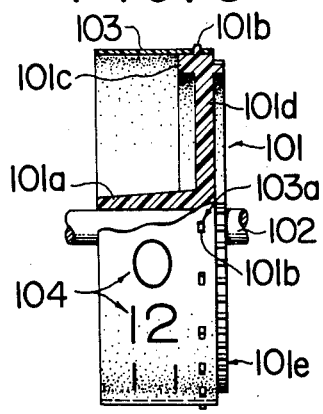
FIG. 8 is a front view, with certain parts being shown in section, of the symbol indication drum comprising a third embodiment of the invention.

The invention will now be described with reference to its application to symbol indication drums each having affixed to the drum body a belt on which symbols are printed. In FIG. 8, a drum body 101 comprises a tubular shaft portion 101a adapted to receive therein a support shaft 102 for supporting the drum body 101, a cylindrical support portion 101c of small width having teeth 101b arranged on its peripheral surface and serving as references when a belt 103 is wound on the drum body, and a connector portion 101d for interconnecting the tubular shaft portion 101a and the cylindrical support portion 101c. A serration 101e is disposed on the right side of the cylindrical support portion 101c for moving the drum in effecting tens transfer.

The various parts of the drum body 101 constructed as aforementioned may be made integrally of any synthetic resinous material which lends itself to molding, or made of metal by working on the metallic material. The drum body may be opaque and colorless or colored, or may be transparent and colorless or colored.

Figure 10:
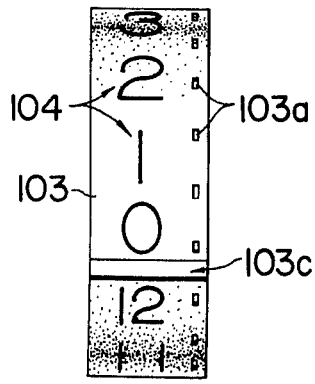
FIG. 10 and FIG. 11 are front views showing a symbol carrying belt affixed to a drum body, with the drum body not being shown.
Figure 11:
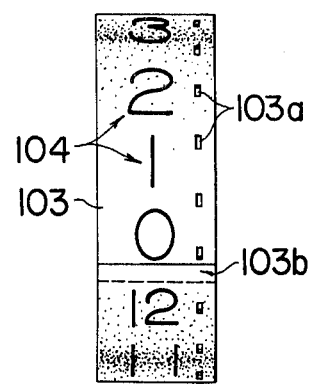

The belt 103 adapted to be wound on the drum body 101, which may be made of artificial leather, a film of a synthetic resinous material, e.g. a polyester, silicone or acetate resin, or a thin sheet of metal, is formed at a side marginal portion thereof with perforations 103a arranged circumferentially of the belt 103 as shown in FIG. 10 or FIG. 11 and adapted to receive therein the teeth 101b on the drum body 101. The belt 103 has printed or otherwise superposed on its surface symbols 104, such as numerals, characters or the like, which are used for giving information. The numerals 104 are printed and the perforations 103a are formed by spreading the belt 103 before being wound on the drum body 101.

The superposing of the numerals 104 and the formation of the perforations 103a may be effected by known methods. The efficiency in operation can be greatly increased if the superposing of the numerals and the forming of the perforations are carried out continuously by using a belt of a large length. Since the belt is a film of a very small thickness, pinholes or other defects can be readily detected. The belt 103 may be opaque and colorless or colored, or transparent and colorless or colored. In superposing the numerals 104 on the belt 103, the numerals may be provided by photographic printing or by gluing to the belt a film on which the numerals 104 are printed beforehand.

The belt 103 produced as aforementioned is wound on the drum body 101 by successively inserting the teeth 101b on the drum body 101 into the perforations 103a in the belt 103. The forward end portion and the rear end portions of the belt 103 may be made not to overlap each other as shown in FIG. 10 or may be made to overlap each other as shown in FIG. 11. In either case, the belt 103 wound on the drum body 101 by using the teeth 101b as references conform to the shape of the cylindrical support portion 101c, so that a satisfactory symbol indication surface can be provided on the periphery of the drum body 101 even if the drum body is slightly deformed.

When the opposite end portions of the belt 103 are not made to overlap each other as shown in FIG. 10, it is necessary that the marginal portion of the belt in which the perforations 103a are formed is made to adhere to the cylindrical support portion 101c of the drum body 101. However, when the opposite end portions are made to overlap each other as shown in FIG. 11, one has only to bond the opposite end portions of the belt to each other at the overlapping portion 103b to provide a satisfactory symbol indication surface for the symbol indication drum without requiring to bond the marginal portion of the belt to the drum body. However, the belt may be bonded to the drum body in any position as desired even when the opposite end portions of the belt are made to overlap each other.

In bonding the belt to the drum body, the two may be adhesively bonded to each other by using an epoxy resin adhesive agent or other suitable adhesive agent, or may be bonded to each other by thermal fusion, high frequency adhesion, or spot welding.

Figure 9:
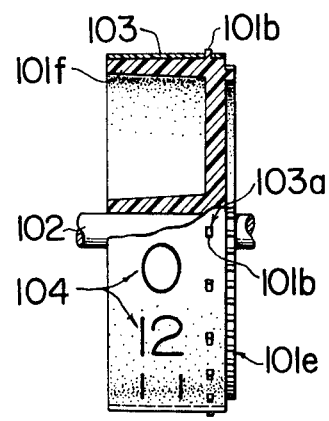
FIG. 9 is a front view, with certain parts being shown in section, of the symbol indications drum comprising a fourth embodiment of the invention.

In winding the belt 103 on the drum body 101, the drum body 101 used may be one in which the cylindrical support portion 101f has a large width as shown in FIG. 9. The use of the cylindrical portion 101c of a small width shown in FIG. 8 offers many advantages. It reduces the weight of the symbol indication drum and solves the problems posed by inertia and other phenomenons. When the symbol indication drum is of the internal illumination system, the drum has an improved light transmission because its thickness is small. When symbol indication is carried out by using a double layer system in which the drum has two peripheral surfaces, the use of a small width cylindrical portion prevents the formation of an offset portion between the inner and outer layers because of the small thickness of the drum.

When a small width cylindrical portion is provided for the drum body, an edge of the belt 101 opposite to the marginal portion of the drum body 101 in which the serration 101e is formed may be used as a locking disk for the tens transfer feed wheel, or a serration may be formed therein for effecting tens transfer. Even if the opposite end portions of the belt do not overlap each other as shown in FIG. 10, a gap 103c in the figure may be conveniently used as a portion of the serration.

In the invention, the teeth and the perforations may be in any number as desired and disposed in any positions as desired in the symbol indication drum. The perforations serve as symbol position ascertaining marks while the teeth serves as means for correctly positioning the symbols on the outer periphery of the symbol indication drum.

What is claimed is:

1. In a method of manufacturing a drum having indicia transferred onto its periphery from an inked master by preparing a relatively elongated master by providing thereon a series of inked indicia in correctly positioned longitudinal relation to each other and each having a lateral edge spaced the same predetermined distance from a reference lateral edge of the master, and rolling a drum longitudinally of the master with a selected axial end thereof coincident with such reference edge to transfer the inked indicia onto the cylindrical periphery of the drum as printed indicia; the improvement comprising the steps of providing a cylindrical tester sleeve of transparent material having an internal diameter slightly greater than the external diameter of the drum; marking a circumferentially continuous reference line on the inner periphery of the tester sleeve with all points thereof at such predetermined distance from one axial end of the tester sleeve; and inserting the printed drum into the tester sleeve with the selected axial end of the drum flush with such one axial end of the tester sleeve to check whether such lateral edges of the printed indicia coincide with such continuous reference line; whereby, by virtue of such circumferentially continuous reference line, all such lateral edges of the printed indicia can be checked simultaneously for such predetermined distance from such selected axial end of the drum without the necessity of effecting relative rotation of the tester sleeve and the drum; further including the step of providing the master with inked reference points each located adjacent a respective indicia, with the reference points being aligned longitudinally of the master and symmetrically located relative to the respective indicia; the inked indicia on the master being essentially centered laterally thereof and the inked reference points being located at such predetermined distance from the reference lateral edge of the master.

2. In a method of manufacturing a drum having indicia transferred onto its periphery from an inked master by preparing a relatively elongated master by providing thereon a series of inked indicia in correctly positioned longitudinal relation to each other and each having a lateral edge spaced the same predetermined distance from a reference lateral edge of the master, and rolling a drum longitudinally of the master with a selected axial end thereof coincident with such reference edge to transfer th inked indicia onto the cylindrical periphery of the drum as printed indicia; the improvement comprising the steps of providing a cylindrical tester sleeve of transparent material having an internal diameter slightly greater than the external diameter of the drum; marking a circumferentially continuous reference line on the inner periphery of the tester sleeve with all points thereof at such predetermined distance from one axial end of the tester sleeve; and inserting the printed drum into the tester sleeve with the selected axial end of the drum flush with such one axial end of the tester sleeve to check whether such lateral edges of the printed indicia coincide with such continuous reference line; whereby, by virtue of such circumferentially continuous reference line, all such lateral edges of the printed indicia can be checked simultaneously for such predetermined distance from such selected axial end of the drum without the necessity of effecting relative rotation of the tester sleeve and the drum; further including the step of providing the series of inked indicia on the master in overlapping relation to provide, on the drum, a series of printed indicia in overlapping relation with each other; providing the master with a series of inked small symbols each adjacent a respective inked indicia and aligned longitudinally of the master adjacent said reference lateral edge of the master; and utilizing a mask to expose selected portions of the overlapped printed indicia on the drum to expose only one printed indicia at a time, while masking the associated small symbol on the drum.

3. The improvement according to claim 2, wherein each said small symbol comprises a representation indicative of its associated one of said printed indicia.

* * * * *